United States Patent
Pope et al.

(10) Patent No.: US 10,652,367 B2
(45) Date of Patent: *May 12, 2020

(54) REDUCING NETWORK LATENCY

(71) Applicant: Xilinx, Inc., San Jose, CA (US)

(72) Inventors: Steven Leslie Pope, Cambridge (GB); David James Riddoch, Fenstanton (GB); Kieran Mansley, Cambridge (GB)

(73) Assignee: Xilinx, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,445

(22) Filed: May 15, 2019

(65) Prior Publication Data

US 2019/0268451 A1    Aug. 29, 2019

Related U.S. Application Data

(63) Continuation of application No. 15/879,909, filed on Jan. 25, 2018, now Pat. No. 10,425,512, which is a continuation of application No. 15/253,822, filed on Aug. 31, 2016, now Pat. No. 10,021,223, which is a continuation of application No. 15/016,659, filed on Feb. 5, 2016, now Pat. No. 9,456,060, which is a continuation of application No. 13/283,420, filed on Oct. 27, 2011, now Pat. No. 9,258,390.

(60) Provisional application No. 61/513,108, filed on Jul. 29, 2011.

(51) Int. Cl.
*H04L 29/06* (2006.01)
*H04L 29/08* (2006.01)
*H04L 12/859* (2013.01)

(52) U.S. Cl.
CPC ............ *H04L 69/22* (2013.01); *H04L 69/161* (2013.01); *H04L 69/166* (2013.01); *H04L 69/329* (2013.01); *H04L 47/2475* (2013.01)

(58) Field of Classification Search
CPC .............................. H04L 69/22; H04L 69/166
See application file for complete search history.

(56) References Cited

U.S. PATENT DOCUMENTS

| | | | | |
|---|---|---|---|---|
| 4,905,234 A | * | 2/1990 | Childress | .................. H04L 1/08 370/349 |
| 5,612,950 A | * | 3/1997 | Young | .................. H04L 1/1803 370/276 |
| 2002/0174240 A1 | * | 11/2002 | Nason | ..................... H04L 29/06 709/230 |

(Continued)

*Primary Examiner* — Arvin Eskandarnia
(74) *Attorney, Agent, or Firm* — Wolf, Greenfield & Sacks, P.C.

(57) ABSTRACT

A method of transmitting data for use at a data processing system and network interface device, the data processing system being coupled to a network by the network interface device, the method comprising: forming a message template in accordance with a predetermined set of network protocols, the message template including at least in part one or more protocol headers; forming an application layer message in one or more parts; updating the message template with the parts of the application layer message; processing the message template in accordance with the predetermined set of network protocols so as to complete the protocol headers; and causing the network interface device to transmit the completed message over the network.

20 Claims, 2 Drawing Sheets

(56) References Cited

U.S. PATENT DOCUMENTS

2007/0209069 A1\* 9/2007 Saklikar .............. H04L 63/1433
726/14

\* cited by examiner

REDUCING NETWORK LATENCY

PRIORITY APPLICATION

The present application is a continuation of and claims the benefit under 35 U.S.C. § 120 of U.S. patent application Ser. No. 15/879,909, entitled "REDUCING NETWORK LATENCY," filed Jan. 25, 2018, which is a continuation of and claims the benefit under 35 U.S.C. § 120 of U.S. patent application Ser. No. 15/253,822, entitled "REDUCING NETWORK LATENCY," filed Aug. 31, 2016, which is a continuation of and claims the benefit under 35 U.S.C. § 120 of U.S. patent application Ser. No. 15/016,659, entitled "REDUCING NETWORK LATENCY," filed on Feb. 5, 2016, now U.S. Pat. No. 9,456,060, which is a continuation of U.S. patent application Ser. No. 13/283,420, entitled "REDUCING NETWORK LATENCY," filed Oct. 27, 2011, now U.S. Pat. No. 9,258,390, which claims priority under 35 U.S.C. § 119 of U.S. Provisional Application Ser. No. 61/513,108, entitled "REDUCING NETWORK LATENCY," filed Jul. 29, 2011, each of which is incorporated herein by reference in its entirety.

BACKGROUND

This invention relates to low-latency methods for transmitting data at a data processing system.

It is generally desirable to minimise the latency associated with sending messages over a network between applications. This enables a receiving application to receive a message the minimum possible time after the sending application forms the message.

It is especially important to minimise the latency over networks that connect high performance computing devices, or computing devices that must react as quickly as possible to incoming data in order to gain a commercial advantage, such as electronic trading devices. In electronic markets, messages sent over networks are used to submit orders and quotes to exchanges and it is often of considerable benefit for a computing system to be able to respond to external stimuli and submit orders and quotes ahead of competitors.

Applications running at computing devices on a network typically communicate over the network using an application-level protocol (such as HTTP or the Financial Information Exchange or FIX protocol) that define a series of structured messages. In order to form each message, the data for transmission must be processed in accordance with the application-level protocol (as well as lower layer protocols, such as Ethernet) in order to form a completed message that is ready for transmission over the network. Typically this protocol processing takes the form of generating headers and calculating error checks (such as CRCs). Such protocol processing can introduce significant latency into the transmission of data since in conventional data transmission systems a network protocol stack must wait for all of the data that is to form a message to be available before commencing protocol processing. This can significantly extend the time elapsed between an application determining that a message is to be sent and that message actually being transmitted onto the wire.

Other causes of transmission latency in conventional systems include the restriction for connection-oriented protocols (such as TCP) that only the protocol stack that negotiated the connection can transmit over the connection. Often such a protocol stack is supported at a host kernel, which does not present a low latency transmission path to applications of the system. Additionally, a modern processor can introduce significant latency if the state and instructions required by a transmission process is not available in cache at the processor.

There is therefore a need for improved methods for transmitting data at a data processing system that reduce the latency associated with message transmission.

SUMMARY

Roughly described, according to a first aspect of the first invention there is provided a method of transmitting data for use at a data processing system supporting an application, a software interface and a network protocol stack, the data processing system being coupled to a network by a network interface device, the method comprising: the application: forming one or more parts of a message for transmission; causing a message template to be generated by means of a first request to the software interface; the software interface: on receiving the first request, causing the network protocol stack to include said one or more parts of the message for transmission in the message template and, in accordance with a predetermined set of protocols, form at least in part one or more protocol headers for the message for transmission; and subsequently: forming one or more further parts of the message for transmission; causing the network protocol stack to include the one or more further parts of the message in the message template and, on completion of the message for transmission, process the message in accordance with the predetermined set of protocols so as to complete the protocol headers; and causing the network interface device to transmit the completed message over the network.

Suitably the step of forming one or more further parts of the message for transmission is performed by the application and the step of causing the network protocol stack to include the one or more further parts of the message in the message template is effected by means of a second request made by the application to the software interface. Suitably the application makes a series of second requests to the software interface, each second request being made on one or more further parts of the message for transmission becoming available to the application. The final request of the second request type in the series preferably completes the message for transmission, causing the network protocol stack to process the message in accordance with the predetermined set of protocols so as to complete the protocol headers and the network protocol stack to transmit the completed message.

Preferably the network protocol stack comprises at least two parts: a first part supported at the data processing system and a second part supported at the network interface device; the first part being configured to perform the step of forming at least in part one or more protocol headers of the message for transmission, and the second part being configured to perform the step of processing the message so as to complete the protocol headers. Preferably the step of forming the one or more further parts of the message for transmission is performed at a data processing engine of the network interface device. Preferably the step of causing the second part of the network protocol stack to process the message so as to complete the protocol headers is performed in response to completing formation of the one or more further parts of the message for transmission.

Preferably the first part of the network protocol stack is a user-level protocol stack.

Suitably at least part of the message template is held at the network interface device.

Preferably the first request includes memory references to the one or more parts of a message for transmission.

The method suitably further comprises, subsequent to the network protocol stack including said one or more parts of the message for transmission in the message template, the network protocol stack performing segmentation of the message template in accordance with a predetermined transport protocol such that the one or more parts of the message are transmitted over the network in one or more message segments by the network interface device. The method suitably further comprises, subsequent to the network protocol stack including said one or more further parts of the message for transmission in the message template, the network protocol stack causing those segments of the message template that correspond to the further parts of the message for transmission to be transmitted over the network by the network interface device. Preferably the step of the network protocol stack causing those segments of the message template that correspond to the further parts of the message for transmission to be transmitted over the network completes the step of the network interface device transmitting the message over the network.

The predetermined transport protocol could be the transmission control protocol.

Suitably the transport protocol is configured such that a message segment can carry a plurality of parts of the message for transmission that are not contiguous in the message for transmission. Suitably a message segment can include one or more header fields that determine the logical position within the message for transmission of the parts of the message in the message segment. Suitably the one or more header fields are formed in a TCP header option. Preferably all of the one or more parts of the message are transmitted over the network in a single message segment by the network interface device.

Suitably at least part of the message template is stored at the network interface device, that part of the message template stored at the network interface device including the one or more parts of a message for transmission.

Preferably the step of the network protocol stack including the one or more further parts of the message in the message template comprises transferring the one or more further parts of the message into the message template using one or more programmed I/O instructions. Alternatively the step of the network protocol stack including the one or more further parts of the message in the message template comprises: for those further parts of the message that are below a predetermined length, transferring the one or more further parts of the message into the message template using one or more programmed I/O instructions; and for those further parts of the message that are above the predetermined length, transferring the one or more further parts of the message into the message template by means of direct memory access by the network interface device.

Preferably the software interface is configured to provide a dummy transmission function by means of which an application can cause the network protocol stack to process the message template in accordance with the predetermined set of protocols as if for transmission by the network interface device, the method further comprising, prior to the step of the network interface device transmitting the message over the network, the application periodically calling the dummy transmission function so as to cause the network protocol stack to process the message template in accordance with the predetermined set of protocols without causing the network interface device to transmit the processed message template over the network.

Suitably the step of calling the dummy transmission function comprises, prior to the network protocol stack processing the message template in accordance with the predetermined set of protocols, the network protocol stack padding the message template with data so as to fill the missing parts of the message for transmission.

The message template could be a logical expression of the message for transmission.

Preferably the software interface is an application programming interface.

Preferably at least part of the network protocol stack is at user level.

According to a second aspect of the first invention there is provided a data processing system coupled to a network by a network interface device and comprising: an application configured to form one or more parts of a message for transmission; a network protocol stack configured to process messages for transmission in accordance with a predetermined set of network protocols; a software interface configured to, in response to a first request, cause the network protocol stack to form at least in part one or more protocol headers of a message for transmission; wherein the application is configured to, on forming one or more parts of a message for transmission, make a first request to the software interface so as to cause the network protocol stack to form a message template comprising at least in part one or more protocol headers of a message for transmission and the one or more parts of the message for transmission; and subsequently: the network protocol stack being configured to, on one or more further parts of the message for transmission being formed, include the one or more further parts of the message in the message template and, on completion of the message for transmission, process the message in accordance with the predetermined set of protocols so as to complete the protocol headers and cause the network interface device to transmit the completed message over the network.

Suitably the application is configured to form the one or more further parts of the message for transmission and to cause the network protocol stack to include the one or more further parts of the message in the message template by means of a second request to the software interface.

Preferably the one or more further parts of the message for transmission are formed at the network interface device at a data processing engine of the network interface, and the network protocol stack comprises at least two parts: a first part supported at the data processing system and a second part supported at the network interface device; the first part being configured to perform the step of forming at least in part one or more protocol headers of the message for transmission, and the second part being configured to perform the step of processing the message so as to complete the protocol headers.

According to a third aspect of the first invention there is provided a method of transmitting data for use at a data processing system and network interface device, the data processing system being coupled to a network by the network interface device, the method comprising: forming a message template in accordance with a predetermined set of network protocols, the message template including at least in part one or more protocol headers; forming an application layer message in one or more parts; updating the message template with the parts of the application layer message; processing the message template in accordance with the predetermined set of network protocols so as to complete the protocol headers; and causing the network interface device to transmit the completed message over the network.

Preferably the step of forming a message template is performed at a network protocol stack supported at the data processing system. The step of forming an application layer message could be performed by one of an application supported at the data processing system, and a data processing engine of the network interface device or other peripheral device of the data processing system. Preferably the processing step is performed at a packet processing engine supported at the network interface device.

According to a fourth aspect of the first invention there is provided a data processing system coupled to a network, the data processing system comprising: a network protocol stack configured to, in accordance with a predetermined set of network protocols, form a message template including at least in part one or more protocol headers; and a message forming engine configured to form an application layer message in one or more parts and, on the formation of each of those parts, cause the respective part of the message to be applied to the message template; wherein the network protocol stack is further configured to, on the application layer message being completed, process the message template in accordance with the predetermined set of network protocols so as to complete the protocol headers and cause the completed message to be transmitted over the network.

Preferably the network protocol stack is supported at a network interface device arranged to couple the data processing system to the network. The message forming engine could be one or both of an application supported at the data processing system or a data processing engine at a network interface device arranged to couple the data processing system to the network.

According to a first aspect of the second invention there is provided a method of transmitting data in accordance with a connection-oriented network protocol, the method being for use at a data processing system coupled to a network and supporting first and second packet processing engines, the method comprising: initiating a connection at the first packet processing engine; the first packet processing engine passing first network protocol state to the second packet processing engine sufficient to permit the second packet processing engine to transmit a specified amount of data over the connection; forming application layer data for transmission; and the second packet processing engine performing packet processing of the application layer data in dependence on the first network protocol state so as to form one or more network messages and causing transmission of one or more network messages over the connection.

Preferably the data processing system is coupled to the network by a network interface device and the second packet processing engine is supported at the network interface device.

Preferably the step of forming application layer data for transmission is performed at a data processing engine of the network interface device. Alternatively the step of forming application layer data for transmission is performed at an application supported at the data processing system. Alternatively the step of forming application layer data for transmission is performed at a data processing engine supported at a peripheral device of the system.

Preferably the passing step is performed in response to a request made by the second packet processing engine.

The first network protocol state could be a message template including at least in part one or more protocol headers for a network message.

Preferably the first packet processing engine performs processing of network messages received over the connection. Preferably the first packet processing engine is a software network protocol stack supported at kernel or user level at the data processing system. Preferably the second packet processing engine is configured to perform packet processing of the application layer data using an FPGA, ASIC, dedicated hardware, or embedded software.

The method could further comprise, subsequent to the passing step, the first packet processing engine signalling to the second packet processing engine so as to cause the second packet processing engine to return control of the connection to the first packet processing engine. The method could further comprise, in response to the signalling, the second packet processing engine completing any pending transmission operations over the connection and passing second network protocol state to the first packet processing engine so as to return control of the connection to the first packet processing engine.

The method preferably further comprises, on the amount of data transmitted over the connection becoming within a predetermined amount of the specified amount of data, the second packet processing engine requesting updated network protocol state from the first packet processing engine and, in response to the request, the first packet processing engine passing updated network protocol state to the second packet processing engine. The method preferably further comprises: forming additional application layer data for transmission; and the second packet processing engine performing packet processing of the additional application layer data in dependence on the updated network protocol state so as to form one or more network messages and causing transmission of the one or more network messages over the connection.

Preferably the steps of forming the application layer data and performing packet processing comprise: forming one or more first parts of the application layer data; the second packet processing engine processing the one or more parts of the application layer data in dependence on the first network protocol state so as to form a message template including at least in part one or more protocol headers; and subsequently: forming one or more additional parts of the application layer data; and updating the message template with the one or more additional parts of the application layer data so as to complete the message template and processing the message template so as to complete the protocol headers.

Preferably the method further comprises, once the specified amount of data has been transmitted over the connection, the second packet processing engine returning control of the connection to the first packet processing engine.

Suitably the connection-oriented network protocol is TCP.

In any aspect of any of the inventions disclosed herein a data processing engine could be an FPGA, ASIC, dedicated hardware, or embedded software.

According to a second aspect of the second invention there is provided a data processing system coupled to a network, the data processing system comprising: a message forming engine operable to form application layer data for transmission over the network in accordance with a connection-oriented network protocol; a first packet processing engine operable to initiate a connection in accordance with the connection-oriented network protocol; a second packet processing engine operable to perform packet processing of application layer data so as to form one or more network messages in accordance with the connection-oriented network protocol; wherein the first packet processing engine is configured to, subsequent to initiating the connection, pass first network protocol state to the second packet processing engine sufficient to permit the second packet processing engine to transmit a specified amount of data over the connection, and the second packet processing engine is configured to, on receiving application layer data from the message forming engine, perform packet processing of the application layer data in dependence on the first network protocol state so as to form one or more network messages and cause transmission of one or more network messages over the connection.

According to a first aspect of a third invention there is provided a method for minimising execution latency of a communication process provided for execution at a data processing system, the data processing system being coupled to a network and supporting a software interface, an application and a network protocol stack providing a communication process, and the method comprising the application periodically making a call to a dummy communication function of the software interface so as to cause the network protocol stack to perform the communication process without communicating data over the network.

Preferably the software interface provides a communication function corresponding to the dummy communication function and the method further comprises the application subsequently making a call to the communication function in respect of a network message so as to cause the network protocol stack to perform the communication process and communicate the network message over the network. Suitably the dummy communication function and the corresponding communication function are one and the same, and the dummy communication function is identified by means of a flag of the communication function.

Suitably the communication process is a transmit process and the step of making a call to a communication function comprises the application periodically making a call to a dummy transmit function of the software interface so as to cause the network protocol stack to perform the transmit process without transmitting data over the network.

Suitably the dummy transmit function is called in respect of a partial message held at a transmit buffer of the data processing system.

Suitably the communication process is a receive process and the step of making a call to a communication function comprises the application periodically making a call to a dummy receive function of the software interface so as to cause the network protocol stack to perform the receive process of the network protocol stack without receiving data over the network.

DESCRIPTION OF THE DRAWINGS

The present invention will now be described by way of example with reference to the accompanying drawings, in which.

DETAILED DESCRIPTION

Figure 1:
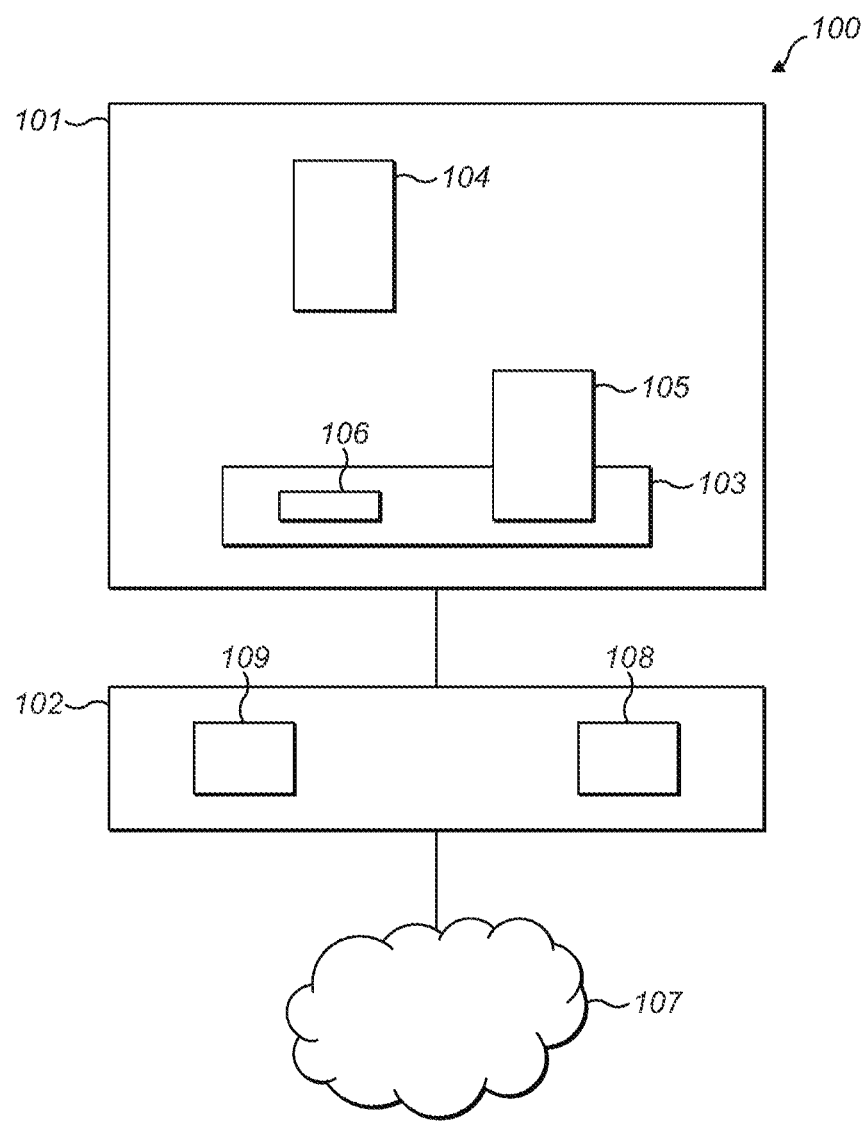
FIG. 1 is a schematic diagram of a data processing system and network interface device configured in accordance with the present invention.

The following description is presented to enable any person skilled in the art to make and use the inventions, and is provided in the context of a particular application. Various modifications to the disclosed embodiments will be readily apparent to those skilled in the art.

The general principles defined herein may be applied to other embodiments and applications without departing from the spirit and scope of the present inventions. Thus, the present inventions are not intended to be limited to the embodiments shown, but is to be accorded the widest scope consistent with the principles and features disclosed herein.

The present inventions relate to the transmission of data over a network between data processing systems. A data processing system could be any kind of computing device, such as a server, personal computer or handheld device. The present inventions are described herein by way of example with reference to networks that operate TCP/IP over Ethernet, but it will be appreciated by the skilled person that the present invention is not so limited and could be implemented with any kind of network (wired or wireless) and set of network protocols. The present inventions are particularly suitable for use at a data processing system and network interface device (NIC) configured such that at least part of the protocol processing of data packets for transmission is performed at the NIC. Thus, at least some of the network protocol stack can be supported at the NIC, with one or more network protocols being offloaded in part or in full to the NIC to be performed in hardware at the NIC.

The present inventions address the latencies introduced in the transmission of data packets or messages over a network when the data for some parts of a network message are not immediately known to the entity that forms the application-layer message and requests the data transmission operation. Often, data that is to constitute some parts of a message are immediately known to an application on determining that a message is to be sent, whilst data for other parts of the message are not known until just before the message is transmitted over the network. In conventional transmission systems, the network stack waits for all of the data for the message to become available prior to performing protocol processing and transmitting the message.

The first of the inventions provides a mechanism by which a network message can be incrementally constructed by one or more network protocol stacks and one or more entities forming application layer data. This can be achieved through the provision of an interface by which an application supported at a data processing system can provide data for transmission to a network stack as and when the data becomes available, allowing the network stack to perform any possible protocol processing and minimising the latency caused by data that is available only at the last moment. The second of the inventions provides a mechanism by which a stream of a connection-oriented protocol can be handed between network protocol stacks. This allows a host to manage the protocol streams but permit another network protocol stack to perform at least some transmission operations at low latency. It is intended that the first and second inventions can be used together. Thus the first invention along with any of its optional features can be implemented with the second invention along with any of its optional features. The first and second inventions described below are therefore not mutually exclusive and disclosure is made of the combination of the first invention in any of its embodiments and the second invention in any of its embodiments.

A schematic diagram of a system 100 configured in accordance with the present inventions is shown in FIG. 1. Data processing system 101 supports an operating system 103 and an application 104 that is operable to communicate over network 107 by means of network interface device or NIC 102 and network protocol stack 105. The network protocol stack is illustrated as a logical block in the figure and all or part of the stack could be supported at kernel, user-level, or at the network interface device 102. All or part of the protocols of the network stack could be performed at a packet processing engine 108 of the network interface device itself. The network interface device could optionally also support a message generating entity 109 configured to generate application-layer network messages in an analogous manner to the way in which application 104 might form messages for transmission over the network. The network interface device could be supported at the data processing system; for example, it could be provided at the mainboard of the data processing system.

The first invention will now be described by way of example with reference to FIG. 1.

The first invention provides a mechanism by which a network message can be incrementally constructed by one or more network protocol stacks and one or more entities forming application layer data. On a request being made to transmit a network message (for example, by means of a call from an application to a socket API provided by the operating system), a network protocol stack of system 100 is configured to generate a message template for the network message in accordance with a predetermined set of network protocols such that the message template includes at least in part one or more protocol headers for the message. If, at the time the transmit request is made, any data for transmission is available from one or more entities of the system that are arranged to form application layer data, the network protocol stack also includes that data in the message template.

Thus, a message template that can include parts of the application-layer message for transmission is generated whilst the remainder of the message is formed. As further parts of the message become available, the message template can be updated with those parts of the message. Once all of the message is available, a network protocol stack of the system completes protocol processing of the data packet so as to complete its protocol headers and the packet is transmitted over the network by the network interface device. The message template is a logical construct that includes the known parts of the message and headers (and/or other data) generated by the protocol stack. The data defining a message template could be included by means of one or more memory references (e.g. to the known parts of the message). The message template could be contiguously defined in memory such as a transmit buffer.

Any of application 104, operating system 103, message generating entity 109 at the NIC, or a message generating entity at another peripheral device of system 100 could be an entity forming application layer data. Either the kernel or user-level network stack 105, or packet processing engine 108 at the NIC represent network protocol stacks. Sometimes it is advantageous for one entity forming application layer data to request transmission of a message and optionally provide some of the message data, and for another entity forming application layer data to complete the message. The first invention can be performed and a network data packet built up incrementally irrespective of where the protocol processing is performed and where the message data is formed.

Similarly, it can be advantageous for one network protocol stack to commence packet processing and for another network protocol stack to complete packet processing. For example, application 104 at the data processing system could request transmission of a network message and provide some of the data for that message before passing over to network generating entity 109 at the NIC, which generates the remainder of the message. The message template in this example be generated at a user level network stack 105 before passing control of the remainder of the processing of the network message to packet processing engine 108 at the NIC. This example ensures that the final parts of a message and the completion of protocol processing of the network message is performed with low latency at the NIC.

According to a preferred embodiment of the first invention, a software interface 106 is provided by means of which application 104 at the host data processing system can request that data for transmission is formed into a message by network stack 105 and transmitted over network 107 by means of NIC 102. Preferably, software interface 106 is an application programming interface or API.

Figure 2:
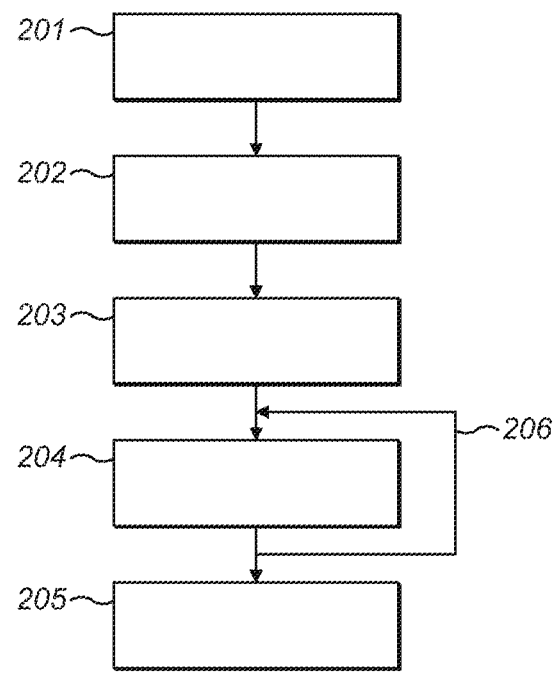
FIG. 2 is a flow chart illustrating data transmission in accordance with the present invention.

A flow chart illustrating data transmission in accordance with the present invention is shown in FIG. 2. On determining that data is to be sent over a network to a remote endpoint, at step 201 application 104 forms those parts of the message that are known to the application and at step 202 requests by means of software interface 106 that a message template is created. The application passes a reference to the data constituting the known parts of the message in its request 202, typically a memory reference to the location of the those message parts in an application buffer. In response to the request the software interface causes network protocol stack 105 to create a message template at step 203 including those known parts of the message that were formed by the application at step 201.

Preferably the network stack populates the message template with data by copying the data known to the application from the application's buffers to the transmit buffer holding the message template, with the data being written to the template at the position that data is to have in the completed message. Alternatively, references to the known application data are included in the message template so as to allow the full message to be logically read from the transmit buffer when the message is completed. The message template represents the completed message once it includes all data for transmission from the application and all protocol processing has been completed by the protocol stack (e.g. to form the appropriate headers for the message). Protocol processing may be performed in software at the data processing system, or in hardware at the network interface device. Typically some protocols are completed on-the-fly by the network interface device as the message traverses the NIC—for example, the calculation of CRC check data for Ethernet data packets. A completed message is transmitted over the network at step 205.

Software interface 106 is configured so as to provide a mechanism by which an application can provide further parts of the message to the network stack as they become known to the application. This is shown by message update step 204 in FIG. 2, which comprises the application making a request to the software interface by means of which it passes one or more references to the data that is to be included as further parts of the message. In response to the message update request, software interface 106 causes the network protocol stack to include the newly-available data into the message template. Message update step 204 can be performed as many times as is necessary to complete the message template, as indicated by return arrow 206.

Figure 3:
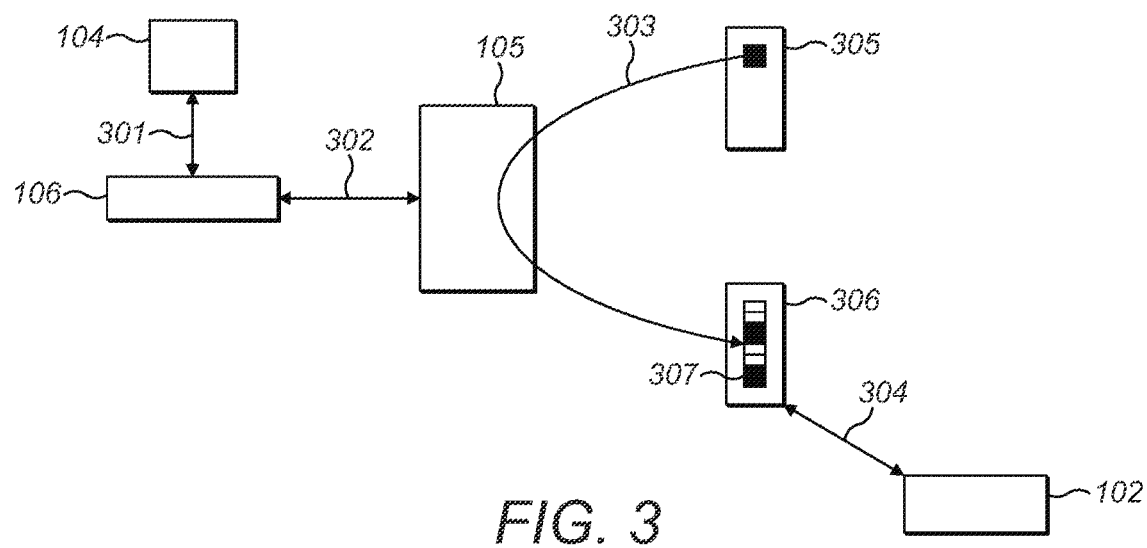
FIG. 3 shows a general overview of the interaction of the various components of FIG. 1.

A general overview of the interaction of the various components of FIG. 1 is shown in FIG. 3. Application 104 is configured to access software interface 106 by means of a set of commands or requests 301. Preferably software interface 106 is an application programming interface (API) with requests 301 being calls to the API. As indicated by arrow 302, the software interface is configured to cause network protocol stack 105 to include data held at the application buffer(s) 305 of application 104 into message template 307 held in transmit buffer 306. Arrow 303 indicates the transfer of data or references to data from the application buffers into the message template.

Additionally, network stack 105 is configured to perform on the data of the message template the appropriate possible protocol processing, such as the formation of protocol headers and footers. For example, even when none or only some of the data of the message is known, for many protocols it is possible to form the source and destination addresses and specify certain header options, such as packet length and sequence number. Performing this processing whilst the application is waiting for some of the packet data to become available minimises the latency associated with transmitting the message since the amount of protocol processing to be performed once all of the message data is known is reduced and hence the time between the last of the message data being available and the point at which the message is actually transmitted is reduced.

Often most of the payload data of a data packet will be available to an application, but some parts of the payload data will only be available immediately prior to the transmission of the data packet over a network. This is typically because the application is performing calculations to determine those parts of the message data. For example, in the case in which the application is an electronic trading application, the application might only determine the price, quantity or symbol for a trade at the last moment before an electronic trading message is sent. However, it is vitally important that the latency of the trade is as small as possible and the present invention achieves this by arranging that as much of the protocol processing of the data packet as possible is performed prior to the final parts of the message being available.

The message template may be held in transmit buffers at the data processing system or at the NIC, or the logical message template could be held in part in memory at the data processing system and in part at memory at the NIC. If the message template 307 is held at the data processing system, the network interface device 102 is preferably configured to have direct memory access (DMA) to transmit buffer(s) 306 and hence reads completed messages from the transmit buffers of the data processing system by means of DMA (indicated by arrow 304 in FIG. 3). If the message template 307 is held in transmit buffer(s) 306 at the NIC, the NIC 102 can access (arrow 304) the message template directly. Arranging that the message template is held at the NIC, with at least some further protocol processing being performed at the NIC can help to further minimise the latency of transmission operations.

Note that network protocol stack 105 is illustrated in the figures as a single entity but may in fact comprise one or more software entities that could be located at kernel or user level at the data processing system. The stack 105 could be a user-level protocol stack configured to perform protocol processing in the context of user-level software so as to minimise context switches into the kernel. Further parts of the total network protocol stack could be performed at the network interface device 102. For example, in the case of a network interface device that supports TCP offload, the majority of TCP protocol processing would be performed at the network interface device.

Protocol processing could be performed at NIC 102 at a packet processing engine 109, which could be, for example, an FPGA, ASIC, embedded software or a hardware protocol processing engine configured to perform dedicated processing according to one or more network protocols. In certain configurations, it can be advantageous for a data processing system and NIC to support multiple entities capable of performing protocol processing. For example, a data processing system might support both kernel and user-level protocol stacks, and at least part of a stack supported at the data processing system could also be supported at the NIC. The data processing system would typically be configured to select the appropriate stack in dependence on the message type, network conditions, or other factors.

Preferably, the initial protocol processing associated with forming the message template at step 203 is performed in software at the data processing system and subsequent protocol processing associated with message update step 204 is performed at NIC 102. This can have significant advantages when the missing parts of the message for transmission are provided as a result of processing performed at the NIC.

For example, consider the situation in which data processing system 101 and NIC 102 form an electronic trading platform whose operation will now be described with respect to the figures. At step 201, the electronic trading software determines that a trade is to be placed at an electronic exchange accessible over network 107 and forms data for transmission in a bid message to the electronic exchange. At step 202, the trading software requests by means of interface 106 that a message template be created and that protocol processing is initiated at a software protocol stack of the data processing system. In response, interface 106 causes the software protocol stack to commence processing of the message and generate the message template in a buffer memory at the NIC.

In the present example, most of the data for transmission is known to the application at the point at which creation of the message template is requested, with the missing parts of the message being determined at the NIC by means of trading algorithms running at the NIC at a message forming entity 108—such as at a dedicated FPGA or ASIC, or by means of software running at a processor supported at the NIC. This allows the software protocol stack to substantially form the message template, leaving the NIC to add the results of its processing and complete the headers immediately prior to transmitting the message over the network from its buffer to the electronic exchange. By locating the final processing of the message as close as possible to the network at the NIC, latency is minimised.

Under the control of the trading software 104, the trading algorithms running at the NIC determine the data for the missing parts of the message template whilst the protocol processing of step 203 is performed. As soon as the parameters of the trade that represent the final parts of the message have been determined by the algorithms, the missing parts of the message are at step 204 included in the message template by the NIC and the network protocol stack at the NIC (packet processing engine 109) completes protocol processing of the data packet before at step 205 transmitting the message over the network to the electronic exchange. Preferably the processes running at the NIC cause the network protocol stack to complete protocol processing of the message. Preferably the processes are executed at one or more FPGA processors of the NIC, the one or more processors optionally including a memory at which the message template is stored.

Typically the trade message would be formed in accordance with the FIX application layer protocol over TCP/IP and Ethernet, with the trading software forming a message in accordance with the FIX protocol and the lower layer protocol stacks being generated at the software stack (which could be at user level) of the data processing system. This would leave the NIC to complete the payload data and message headers in accordance with the appropriate protocols once the trading algorithms at the NIC determine the parameters of the bid (e.g. number of stocks, stock symbol, etc.).

Three transmission mechanisms for use in accordance with the first invention will now be described.

A first transmission mechanism can be used with messaging protocols that support segmentation, such as the Transmission Control Protocol (TCP) which will now be discussed by way of example. TCP includes a segmentation algorithm that allows a stream of messages to be split into multiple segments, each of which includes a sequence number so that the receiver can reassemble the message stream even when segments arrive out of order. In this embodiment, the network protocol stack is configured to cause the network interface device to transmit at least some of the known parts of a message prior to the message template being completed. This is achieved by configuring the network protocol stack to send the known parts of a message template as TCP segments, with subsequent parts of the message being transmitted as further TCP segments as they become known.

For example, for a message of total length 30 bytes, with 2 bytes initially unknown at offset 10 bytes, the following TCP segments would be initially transmitted:

tcp-seq-1: seq=0, len=10
tcp-seg-2: seq=12, len=18

On receiving these segments, the receiving data processing system can deliver the first 10 bytes of the message to the receiving application but not any more since it does not yet have the data at sequence position 10. Later, when the missing 2 bytes are known, the following TCP segment would be transmitted:

tcp-seg-3: seq=10, len=2

The receiving data processing system can then deliver the remaining 20 bytes of the message to the receiving application.

The protocol processing stack is configured to perform segmentation of the incomplete message template by forming each contiguous known part of the message into a message segment and passing the segment to the network interface device for transmission. The protocol processing stack could be configured to only form a message segment for contiguous parts of the message that exceed a predetermined length so as to avoid the overhead associated with sending many small data packets. Note that the message template and message segment(s) need not be a contiguously stored at a transmit buffer and could be logically represented at a transmit buffer such that it is not necessary to duplicate known parts of the message data in memory—one or both of the message template and a message segment could refer to the location of the message data held in the transmit buffer.

This embodiment is of particular benefit if the known parts of the message are large and the updates are small, since the latency critical step of forming and sending the last parts of the segmented message involves sending one (or sometimes a small number of) small message segment(s).

However, there are problems with using the TCP protocol in this manner:

Each TCP segment can only contain a subset of the message that is contiguous in the sequence space of the message stream. Hence in the above example, two segments were needed to transfer only 28 bytes, which is highly inefficient. This is particularly a problem if a message template is completed by multiple discrete message parts that require multiple message segments to be transmitted in order to complete the transfer of the message data to the receiving data processing system because the formation and transmission of the last message segments is critical to the overall latency of the message transmission operation.

The technique can only be used if the size of the unknown segments of data are known in advance because it is necessary to know where each message part is located in the sequence space.

The receiving TCP implementation receives the arriving updates out of order and therefore will respond to such message segments with an ACK message. This can increase the latency of message reception.

In a second transmission mechanism it is therefore proposed that the TCP protocol is extended or replaced with a new transport protocol that allows multiple message segments to be delivered in a single multi-segment network message. This can be achieved by defining in the protocol a multi-segment message format arranged to carry multiple segments of a message as a contiguous data payload and header fields that specify the how the contiguous data payload should be split up into its constituent message segments at the receiving data processing system. For example, by specifying in header fields the byte offset within the parent message and length of each message segment in the payload, the message segments can be extracted from the payload of the multi-segment message and reassembled to form the parent message. The message segments forming the payload of the multi-segment message could be separated by markers delineating the message segments; these markers could be headers carrying the byte offset and optionally length information of the respective segment in the parent message.

The TCP protocol can be extended to support multiple message segments in each TCP segment by defining a new TCP header option type to describe the layout of the message segments.

For small messages, the cost of segmentation and reassembly in order to transfer known parts of a message in advance can outweigh the benefits. A third transmission mechanism proposes an alternative strategy in which known parts of a message are transferred to buffers at a network interface device in advance of those parts of a message not yet available to an application. In this embodiment, transmit buffer 306 is located in memory at the network interface device such that the message template is formed at a network interface device buffer and data for transmission is copied into the message template at the NIC in accordance with steps 203 and 204 of FIG. 2. This ensures that as much data as possible is held as close as possible to the NIC at the point when the last of the message data becomes available.

Message data constituting the parts of the message to be held in the message template can be transferred to the NIC 102 using programmed I/O (PIO) instructions or direct memory access (DMA) by the NIC to buffers held at the data processing system (these buffers could include application buffer 305, or be an intermediate buffer supported by the network protocol stack). Preferably message update step 204 in FIG. 2 is performed using PIO instructions to transfer newly-available message parts into the message template, with the host CPU of the data processing system performing the transfer. This has lower latency than DMA when small amounts of data are transferred. The initial transfer of data at step 203 from the application buffer to the transmit buffer can be performed by DMA.

Most preferably, the decision as to whether to perform message update step 204 by PIO or DMA transfer is made dynamically in dependence on the size of the message part being transferred, with messages below a predetermined threshold size being transmitted using PIO and messages above that threshold being transmitted using DMA.

The second of the inventions will now be described, which provides a mechanism by which a stream of a connection-oriented protocol can be handed between network protocol stacks.

In general it is not possible for more than one stack to transmit messages over a given connection of a connection-oriented network protocol such as TCP. In order to maintain the order of messages over a connection under varying network conditions, the state information (such as sequence number and receive window parameters) associated with that connection is required and that state information resides with the protocol stack that established the connection.

This invention provides a mechanism by which one network stack can hand over the ability to transmit over a connection to another network stack for a limited period. This will be illustrated by way of example with reference to the system 100 of FIG. 1. Consider a first packet processing engine (network stack 105 at data processing system 101) that has established a TCP connection over network 107 and a second packet processing engine (network stack 109 at network interface device 102) that wishes to transmit over that connection. In accordance with the invention, network stack 105 passes network protocol state to the NIC network stack 109 that is sufficient to allow the second packet processing engine to transmit a specified amount of data over the connection. This state can include one or more sequence numbers, congestion window and/or receive window parameters, network addresses and port numbers. By transmitting this state to network stack 109, network stack 105 passes permission to the network stack 109 to transmit data over the network.

Typically the state includes at least the current sequence number and a parameter identifying the receive window remaining. This allows network stack 109 to start transmitting data packets over the connection until the remaining receive window is used up, at which point network stack 109 returns control to the parent network stack 105. Note that the connection state itself need not be copied between the network stacks and the passing of connection state to network stack 109 could be achieved by passing one or more memory references to the state or a copy of the state held in memory at the data processing system.

Most generally, this invention provides a mechanism by which one network stack can hand over the ability to transmit over a connection to another network stack irrespective of the locations of those network stacks: either one could be at the kernel of operating system 103, supported at user level of the data processing system, at packet processing engine 108 of NIC 102, or at another peripheral device of the system.

Application layer data for transmission over the connection could be formed at any point in system 100: at the kernel of operating system 103, at application 104, at message forming entity 109 of NIC 102, or at another peripheral device of the system. Application layer data for transmission over the connection by means of the slave network stack (e.g. 109 in the above example) is provided to the slave network stack and the slave network stack is configured to process the application layer message in dependence on the received state so as to prepare the message for transmission over the connection by the NIC.

The second invention is particularly advantageous if the message forming entity is close to the slave network stack so as to minimise the latency between the application layer message being formed and the resulting data packet being sent over the connection. Most preferably, the slave network stack is packet processing engine 108 and the message forming entity 109 is located at the NIC. This arrangement is particularly effective at minimising the latency of transmission because the formation of application layer messages and the processing of those messages into data packets for transmission over the connection is performed as close as possible at the NIC that effects the transmission of the data packets over the wire. Furthermore, this mechanism can avoid implementing the entirety of the connection-oriented protocol in hardware at a NIC, which would be very complex and requires significant processing and memory resources at the NIC.

Preferably the parent network stack maintains control of the receive path of the connection.

Once the slave network stack has transmitted its allowance of data over the connection, the slave stack returns control to the parent stack and optionally requests permission to transmit additional data over the connection. Alternatively, such permission could be requested on behalf of the slave stack—for example, by an application 104 at the data processing system. It is also preferable if the parent stack can direct the slave stack to return control to the parent stack at any moment so as to allow the parent stack to perform its own transmission operations—for example, to transmit messages required to maintain the connection.

To give a particular example, data processing system 101 might support an electronic trading application 104 that is configured to make use of a set of trading algorithms arranged to execute at an FPGA 109 of NIC 102. On identifying that a set of trades are to be made, application 104 can request that user-level network stack 105 permit packet processing engine 108 to transmit a specified amount of data over a TCP connection established by network stack 105 to an electronic exchange. The application could make such a request by means of software interface 106 described in relation to the first invention. FPGA 109 at the NIC can then operate autonomously, receiving data over network 107 from an electronic exchange and forming application layer bid and quote messages in response in accordance with its trading algorithms. Since packet processing engine 109 has permission and the necessary state to transmit over the TCP connection to the electronic exchange, the packet processing engine can process the application layer messages at the NIC and transmit the resulting data packets over the wire at very low latency.

The second invention and first invention can be utilised together with the slave network stack being configured to complete message templates generated by the parent network stack. In fact, the network protocol state passed from the parent stack to slave stack can be a set of one or more message templates generated by the parent network stack. Thus, the parent network stack can prepare a set of message templates which are passed to the slave stack for completion with application layer data and processing in accordance with the connection oriented protocol. The slave network stack can alternatively be configured to form message templates at the NIC in dependence on the state received from the parent network stack, though the slave network stack need not itself be supported at the NIC. The message templates could be stored in memory at the NIC, or at a memory of a message forming entity supported at the NIC (e.g. at a memory of an FPGA configured to from the application layer data).

In any of the embodiments of the present invention described herein it is advantageous to configure software interface 106 to provide a "dummy" transmission function that causes the appropriate CPU core of the data processing system to execute a transmit code path without actually causing any data to be transmitted over the network. This has the effect of ensuring that the instructions and state required to execute the code path are resident in the cache of the appropriate CPU core of the data processing system. This is advantageous because the time taken to execute a particular code path is generally highly dependent on whether the instructions that define the code path, and the state touched by the code path, are resident in the cache of the CPU core executing that code path. If the instructions and state are not resident in the cache, the code path typically executes much more slowly.

A dummy transmission function is provided that can be called by a software interface so as to cause the appropriate CPU core to, from its point of view, perform a transmission operation on the message template stored at the transmit buffer. In other words, the software interface causes the network protocol stack to process the message template in preparation for transmission by the NIC as though the message template were complete. However, the message template is not actually transmitted by the NIC and is preferably not passed to the NIC at all, by PIO or by DMA transfer. The missing portions of the message could be padded with values so as to form a "complete" message that can be processed by the stack.

More broadly, a software interface can be configured to provide a dummy transmit function and/or a dummy receive function configured to cause the appropriate CPU core to perform a transmission or receive operation (as appropriate) without actually transmitting or receiving any data at the data processing system. Such a software interface need not be operable to form a message template as described above in relation to FIGS. 1 to 3. A dummy transmit function is configured to cause execution of the transmit code path of the appropriate network protocol stack so as to bring the state required by the transmit code path of the network protocol stack into the cache of the processor that would perform the respective actual transmit operations. A dummy receive function is configured to cause execution of the receive code path of the appropriate network protocol stack so as to bring the state required by the receive code path of the network protocol stack into the cache of the processor that would perform the respective actual receive operations. These dummy functions have the effect of ensuring that the instructions and state required to execute the code path are resident in the cache of the appropriate CPU core of the data processing system.

Preferably the dummy transmit or receive functions are called by means of regular transmit or receive functions (such as send( ) or recv( ) TCP socket calls) carrying a predetermined flag that indicates to the software interface that the transmit/receive function is a dummy function. This ensures that calls to the dummy transmit/receive functions use the same entry point as regular transmit/receive function calls. No payload data need be provided with calls to a dummy transmit function, and no payload data need be returned in response to a dummy receive function. The software interface is preferably a socket API.

Preferably an application is configured to periodically invoke a dummy transmit and/or receive function of the software interface so as to increase the likelihood that the appropriate instructions and state are in the cache when required by genuine transmit or receive operations.

By providing dummy transmit/receive functions, the software interface allows an application to prepare the cache of a CPU and ensure that latency of the transmit/receive code paths is minimised.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A method of transmitting a message, the method for use at a data processing system supporting an application and a network protocol stack, the data processing system being coupled to a network, the method comprising:
   forming, at least in part, one or more protocol headers;
   forming, by the application, a plurality of parts of the message;
   causing inclusion in the message, said plurality of parts of the message and the at least in part one or more protocol headers to form an incomplete message; and
   performing segmentation of the incomplete message in accordance with a predetermined transport protocol such that at least some of the plurality of parts of the message are transmitted over the network in a plurality of message segments.

2. A method as claimed in claim 1, wherein each of the plurality of message segments comprises a different sequence number.

3. A method as claimed in claim 1, comprising, subsequently:
   forming, by the application one or more further parts of the message;
   transmitting, the one or more further parts of the message in one or more further message segments.

4. A method as claimed in claim 1, wherein each of the plurality of parts is a contiguous part of the incomplete message, wherein performing segmentation of the incomplete message comprises forming each of at least some of the plurality of contiguous parts into one of the plurality of message segments.

5. A method as claimed in claim 4, comprising for each of the at least some of the plurality of contiguous parts:
   determining that the respective contiguous part exceeds a predetermined length; and
   in response to determining that the respective contiguous part exceeds a predetermined length, forming the respective contiguous part into one of the plurality of message segments.

6. A method as claimed in claim 1, wherein the incomplete message is logically represented at a transmit buffer of the data processing system, the transmit buffer containing pointers to data of the plurality of parts in memory of the data processing system.

7. A method as claimed in claim 1, comprising transmitting each of the plurality of message segments in a single network message.

8. A method as claimed in claim 7, wherein the single network message comprises a header indicating each of the plurality of message segments in a payload of the single network message.

9. A method as claimed in claim 8, wherein the indication of each of the plurality of message segments comprises a byte offset and a length of each of the plurality of message segments in the payload.

10. A method as claimed in claim 7, wherein a payload of the single network message comprises:
the plurality of message segments; and
a plurality of markers, wherein each marker delineates different message segments of the plurality of message segments in the payload.

11. A method as claimed in claim 7, wherein the single network message comprises non-contiguous parts of the incomplete message.

12. A method as claimed in claim 1, comprising forming the incomplete message in a transmit buffer of a network interface device of the data processing system.

13. A data processing system coupled to a network, wherein the data processing system comprises at least one processor configured to execute computer readable instructions so as to provide:
a network protocol stack configured to form, at least in part, one or more protocol headers; and
an application configured to form a plurality of parts of a message,
wherein said network protocol stack is configured to:
cause inclusion in the message, said plurality of parts of the message and the at least in part one or more protocol headers to form an incomplete message; and
perform segmentation of the incomplete message in accordance with a predetermined transport protocol such that at least some of the plurality of parts of the message are transmitted over the network in a plurality of message segments.

14. A data processing system as claimed in claim 13, wherein each of the plurality of message segments comprises a different sequence number.

15. A data processing system as claimed in claim 13, wherein the application is configured to subsequently form, one or more further parts of the message, wherein the network protocol stack is configured to transmit, the one or more further parts of the message in one or more further message segments.

16. A data processing system as claimed in claim 13, wherein each of the plurality of parts is a contiguous part of the incomplete message, wherein performing segmentation of the incomplete message comprises forming each of at least some of the plurality of contiguous parts into one of the plurality of message segments.

17. A data processing system as claimed in claim 16, wherein the network protocol stack is configured to, for each of the at least some of the plurality of contiguous parts:
determine that the respective contiguous part exceeds a predetermined length; and
in response to determining that the respective contiguous part exceeds a predetermined length, form the respective contiguous part into one of the plurality of message segments.

18. A method as claimed in claim 13, wherein the incomplete message is logically represented at a transmit buffer of the data processing system, the transmit buffer containing pointers to data of the plurality of parts in memory of the data processing system.

19. A method as claimed in claim 1, wherein the network protocol stack is configured to transmit each of the plurality of message segments in a single network message.

20. A method as claimed in claim 19, wherein the single network message comprises a header indicating each of the plurality of message segments in a payload of the single network message.

* * * * *